J. L. WOODBRIDGE.
MEANS FOR TRANSMISSION OF POWER.
APPLICATION FILED APR. 16, 1917.
1,312,604.
Patented Aug. 12, 1919.
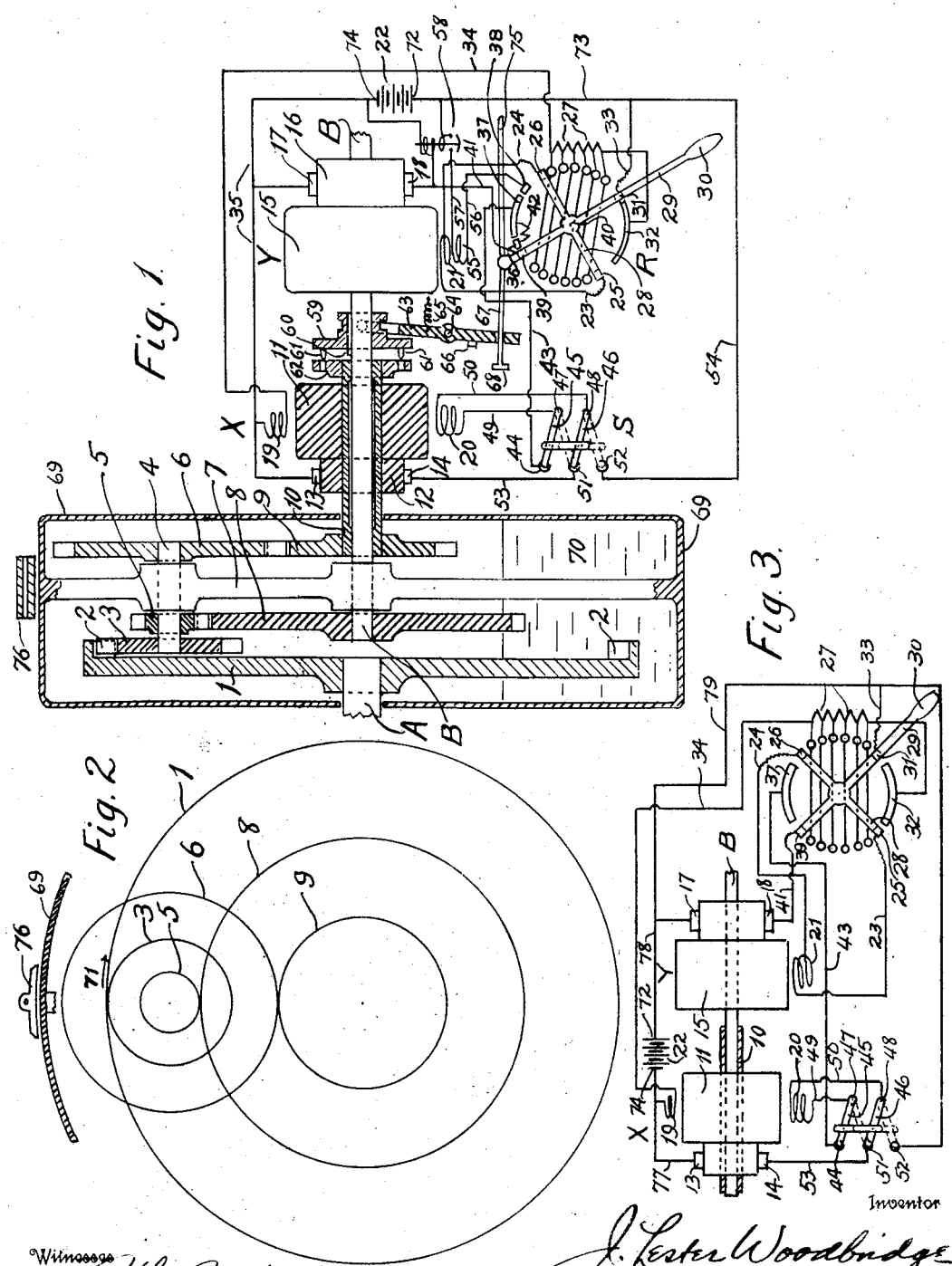

UNITED STATES PATENT OFFICE.

JOSEPH LESTER WOODBRIDGE, OF PHILADELPHIA, PENNSYLVANIA.

MEANS FOR TRANSMISSION OF POWER.

1,312,604.      Specification of Letters Patent.      Patented Aug. 12, 1919.

Application filed April 16, 1917. Serial No. 162,492.

*To all whom it may concern:*

Be it known that I, JOSEPH LESTER WOODBRIDGE, a citizen of the United States, and a resident of Philadelphia, in the State of Pennsylvania, have invented certain new and useful Improvements in Means for Transmission of Power, of which the following is a specification.

My invention relates to apparatus in which power is to be transmitted from one rotating shaft to another, and in which the speed ratio of the two shafts is to be controlled and the object of my invention is to provide comparatively light, less expensive and more efficient means for transmitting power between two such shafts, as well as to provide means for more convenient and flexible control of the speed ratio. These and other objects of the invention will be more clearly understood from the following description taken in connection with the accompanying drawings in which—

Figure 1 is a longitudinal elevation, partly in section and partly diagrammatic, of one embodiment of my invention.

Fig. 2 shows the gear wheels of Fig. 1 represented by their pitch circles and viewed axially from the right hand side of Fig. 1, and Fig. 3 is a modification of the electrical circuits of Fig. 1.

For simplicity the same reference numbers used to designate the gear wheels in Fig. 1 are used to designate the corresponding pitch-circles in Fig. 2. In Fig. 1, A is the driving shaft to which power may be supplied by any suitable source, such as an internal combustion engine or an electric motor, B is the driven shaft which receives power from the shaft A through the transmission apparatus illustrated in the drawings and described below, whereby the relative speed and direction of rotation of the two shafts may be controlled at will.

On the end of the shaft A is rigidly mounted the gear wheel 1, having internally projecting teeth 2, which engage with the external teeth of the gear wheel 3. The gear wheel 3 is rigidly mounted on an intermediate shaft 4, upon which shaft are also rigidly mounted the gear wheels 5 and 6. As here shown, the gear wheel 5 is of smaller diameter and the gear wheel 6 is of larger diameter than 3, and these three gear wheels, being rigidly mounted on the same shaft 4, must rotate together.

The intermediate shaft 4 is free to revolve in a bearing at the outer end of a bar 7, which bar is supported on the shaft B in such manner that it is normally free to revolve in a plane at right angles to the axis of said shaft.

The gear wheel 5 is provided with externally projecting teeth which engage with similar teeth of the gear wheel 8, which is rigidly mounted on the end of shaft B. The gear wheel 6 is provided with externally projecting teeth which engage with similar teeth on the gear wheel 9, which is rigidly mounted on an auxiliary hollow shaft or quill 10, surrounding the shaft B and normally free to rotate with reference to the latter shaft. On the quill 10 is mounted the armature 11 of a dynamo-electric machine X, provided with a commutator 12 and brushes 13 and 14. On the shaft B is mounted the armature 15 of another dynamo-electric machine Y, having a commutator 16 and brushes 17 and 18. The machine X is provided with a separately excited field winding 19, and a series field winding 20. The machine Y is provided with a separately excited field winding 21, and a series field winding 55. Any suitable source may be employed to furnish current for exciting the field windings 19 and 21, such as the storage battery 22.

The terminals of the field winding 21 are connected by flexible conductors 23 and 24 to the movable contacts 25 and 26 respectively of a current reversing rheostat R of the well known potentiometer type, consisting of a series of resistors, 27, connected to two sets of contact points, oppositely connected in pairs, over which the movable contacts 25 and 26 are made to pass by rotation of the rheostat arm 28, pivoted at 40, whereby the current in the field winding 21 may be varied from a maximum in one direction through zero to a maximum in the other direction. The rheostat arm 28 is rigidly attached to another arm 29 provided with a handle 30. Upon the arm 29, and suitably insulated therefrom is mounted a contact piece 31, which by moving the arm 29 may be brought into contact with the fixed contact sector 32. Contact piece 31 is connected by the flexible conductor 33 to one terminal of the battery 22, while the sector 32 is connected to one end of the series of resistors 27. The other end of said series is connected by conductor 34, field winding 19, and conductor 35, to the opposite terminal of battery 22. Thus when contact piece 31 is brought into contact with sector 32, current from the battery passes through field winding 19 and resistors 27, always in the same direction; and also through field winding 21 in amount and direction depending on the position of rheostat arm 28.

Mounted on the rheostat R, diametrically opposite to the sector 32 are shown three contact sectors 36, 37 and 38, with a corresponding contact piece 39 carried by and insulated from the arm 29, and arranged to make contact with 36, 37 and 38, as the arm 29 is moved about the pivot 40. Contact piece 39 is connected by a flexible conductor 41 to brush 18 of machine Y. Sectors 36 and 37 are connected to each other through a resistance 42, and sector 37 is connected by conductor 43 to the contact point 44 of the double pole two-way reversing switch S. The two blades of this switch, 45 and 46, are hinged respectively at 47 and 48, said hinge points being connected by conductors 49 and 50, respectively, to the corresponding terminals of series field winding 20 of machine X. The free end of switch blade 46, in the position shown by full lines, is connected by contact point 51 and conductor 53 to brush 14 of machine X. Brush 13 of machine X is permanently connected with brush 17 of machine Y and with one terminal of battery 22 by conductor 35.

When switch S is thrown over into the starting position shown by the dotted lines, the direction of current in the series field winding 20 is reversed with respect to the armature current, and at the same time connection with conductor 43 is broken and connection is established by conductor 54 with the opposite terminal of battery 22.

Sector 38 of rheostat R is connected by conductor 56 to one terminal of series winding 55 of machine Y, while the other end of this winding is connected by conductor 57 and automatic switch 58 (when the latter is closed) to the corresponding terminal of the battery.

A clutch is shown at 59, mounted on and driven by shaft B, by means of the feather 60. By sliding this clutch to the left, it engages by means of pins 61 with the disk 62, which is rigidly attached to the quill 10, and thus the shaft B and quill 10 are interlocked and must then revolve together. Clutch 59 is thrown in and out by a forked lever 63, pivoted at 64, and held by the spring 65 against the stop 66 in a position to disengage the clutch 59. A bar 67, hinged to the upper end of rheostat arm 29, passes through an opening in the lower end of lever 63 and is provided with a head 68 whereby the clutch 59 is thrown into engagement with disk 62 when the handle 30 of arm 29 is thrown into its extreme left-hand position. To the outer ends of the bar 7 is attached a casing 69, which incloses the gear wheels and may be partially filled with oil or similar lubricant 70.

The operation of the apparatus above described is as follows:

Assume the shaft B to be at rest and the shaft A with its attached internal gear wheel 1 to be revolving in clockwise direction as indicated by the arrow 71. The gear wheel 8, attached to shaft B will be at rest, and the motion of gear wheel 1 will impart clockwise rotation to the three gear wheels 3, 5, and 6 and to the shaft 4 upon which they are mounted. Because the gear wheel 8 is at rest, the gear wheel 5 will be compelled to roll around the periphery of 8 in a clockwise direction, carrying with it the shaft 4 and the arm 7. The gear wheel 6, having a greater diameter than 5 will have a greater peripheral velocity and will therefore drive the gear wheel 9 and the quill 10 in a counter-clockwise direction with a velocity depending upon the velocity of the shaft A and the relative diameters of the several gear wheels. So long as the arm 7 is free to rotate, no force can be transmitted from the gear wheel 5 to the gear wheel 8 unless some opposing resistance is offered by the gear wheel 9; and similarly no force can be transmitted to the gear wheel 9 unless some opposing resistance is offered by the gear wheel 8. In fact, any driving force exerted by the driving shaft A is transmitted simultaneously to the two gear wheels 8 and 9 in a definite ratio, tending to drive them in opposite directions, each of the two gear wheels 8 and 9 acting as a fulcrum for the application of force to the other.

If now, instead of remaining at rest, the shaft B begins to rotate in a clockwise direction, the speed of rotation of the gear wheel 9, counter-clockwise, will decrease, and as the shaft B increases in speed, the gear wheel 9 will run more and more slowly until finally, at a certain speed of shaft B, the gear wheel 9 will come to rest. Any further increase in the speed of shaft B will cause the gear wheel 9 to reverse its direction of rotation, which will become clockwise and as the speed of B continues to increase, the gear wheel 9 and the quill 10 may finally revolve at the same speed as B or even at a greater speed.

Whenever the shaft B and the quill 10 are revolving in opposite directions in response to the forces applied to them as above, energy is being delivered to both by the shaft A. That delivered to B may be utilized, as for example for propelling a vehicle or in any other desired manner. The energy delivered to the quill 10 should also be utilized, in order to attain maximum efficiency. One means for utilizing the latter energy is provided by the two dynamo-electric machines X and Y, by which the energy delivered to quill 10 is converted to electrical energy in X and reconverted to mechanical energy and delivered to the shaft B by the machine Y. Thus a part of the total energy is transmitted from shaft A to shaft B by direct mechanical contact, while a part is transmitted by electro-mechanical means.

The mode of operation of these latter means and their control will now be described.

Assuming the shaft A and gear wheel 1 to be revolving in clockwise direction and the shaft B at rest, the quill 10 and armature 11 will be revolving in a counter-clockwise direction, but, in the absence of any field excitation and neglecting friction, no counter-resistance or torque will be developed and no driving force will be applied to shaft B. Now let the arm 29 be moved to the left until contact is made between contact piece 31 and sector 32. A circuit is thereby established from terminal 72 of battery 22 via 73, 31, 32, 33, resistors 27, conductor 34, field winding 19 and conductor 35 to the opposite terminal 74 of the battery, thus exciting the field of machine X and developing voltage across the brushes 13, 14. Only a small excitation will usually be required in winding 19, as this will be supplemented by that of the series winding 20 as soon as current flows therethrough, and in some cases the residual magnetism may be sufficient without the field winding 19. The movement of arm 29 will also make contact between 39 and 36, thus establishing a circuit from brush 14 via 53, 51, 46, 48, series field winding 20, 49, 47, 45, 44, 43, 37, 42, 36, 39, 41, brush 18, armature 15, brush 17, 35, brush 13 and armature 11 to brush 14. Current will flow through this circuit, and the connection of series winding 20 should be such as to develop voltage in armature 11 to assist this flow of current. Armature 11 is then acting as a generator, offering considerable resistance to its rotation, tending to slow it down, and at the same time supplying the necessary reaction at the periphery of gear wheel 9 to cause it to act as a fulcrum for driving gear wheel 8 and shaft B in clockwise direction. This will start rotation of armature 15. Field winding 21 is also excited by current diverted from resistor 27, across which it is connected by conductors 23 and 24 and contacts 25 and 26 and the direction of winding 21 is such as to produce a field excitation which in conjunction with the current in armature 15 produces motor action, thus applying additional torque to shaft B in clockwise direction. The rotation of armature 15 will develop a counter-electromotive force to oppose the flow of current, but at first, when the rotation is slow, this counter-electro-motive-force will be small, while the high speed of armature 11 with the cumulative effect of series winding 20 will develop a considerable electro-motive force in armature 11. The resistance 42, which is at first in circuit, serves to prevent excessive flow of current in the first contact position of arm 29. The various parts of the apparatus may, however, be so designed as to produce a very high starting torque on shaft B, with comparatively slow speed. If this torque is greater than required to overcome the resistance of any load to which shaft B is connected, this shaft will accelerate, but a condition of equilibrium will eventually be established, since increase of speed of shaft B will increase the counter-electro-motive-force in armature 15, thus reducing the flow of current,—and furthermore, any increase in speed of shaft B must be accompanied by a decrease of speed of quill 10 and armature 11, (assuming constant speed of shaft A) as explained above in connection with the operation of the gear wheels, thus reducing the voltage developed in armature 11, and still further reducing the flow of current. Moreover, the reduction of current in series field 20 will also operate to reduce the voltage of armature 11. The operation is therefore perfectly stable.

As the arm 29 is moved still farther to the left, the contacts 25 and 26 will be moved over the contact points of rheostat R in the direction to reduce the potential applied across the terminals of field winding 21, thus reducing the counter-electro-motive-force in armature 15, increasing the flow of current between the two armatures, increasing temporarily the torque developed in armature 15 and the reactive torque of armature 11, and producing a further acceleration of shaft B until equilibrium is again established at higher speed.

It will be seen from the above, that by controlling the field excitation of machine Y by means of rheostat R the relative speeds of shafts A and B may be controlled, and no loss of energy is involved other than the losses inherent in the machines and gearing, which by suitable design may be reduced to nominal values.

If the movement of arm 29 of rheostat R is continued, a point will be reached when the field excitation of machine Y is reduced to zero. This machine will then develop no torque, but current will continue to flow through its armature in the same direction, developed by the rotation of armature 11, whose field excitation is maintained by both its field windings 19 and 20. Armature 11 will thus continue to develop the reactive torque necessary for driving shaft B through the gear wheels. Up to this point, the armature 11 must continue to rotate in counter-clockwise direction in order to develop the necessary electro-motive-force to maintain the flow of current. So long as this rotation of armature 11 and quill 10 is maintained, shaft B must revolve at a speed somewhat less than shaft A.

Assume now that the movement of rheostat arm 29 is continued still further producing a reversal of current in field winding 21. This will reverse the electro-motive-force of armature 15, which will now be in a direction to assist the flow of current. Armature 15 will now be acting as a generator, and will maintain the flow of current in the same direction as before. The speed of rotation of armature 11 may now be reduced to zero, while its reactive torque will be maintained since the current will still flow through its armature and field windings. A further movement of rheostat arm 29 producing further increase of generator voltage and further increase of current will then cause armature 11 to begin rotation in clockwise direction. Armature 11 will then be running as a motor, and the energy developed, taken from armature 15 and shaft B, will be returned to the latter through the gear wheels.

Armature 11 and quill 10 are now rotating in the same direction as shaft B and when the point is reached where they are both revolving at approximately the same speed, the clutch 59 may be thrown into engagement with disk 62, and the two mechanically interlocked. This may be accomplished as shown in Fig. 1 by the movement of the rheostat arm operating through the link 67 with its head 68 and the lever 63. At the same time, contact 39 passes out of contact with sector 37 and into contact with contact point 38. This opens the circuit between the two armatures and interrupts the flow of current which is no longer needed, by reason of the mechanical interlock.

The contact between 39 and 38 establishes a circuit for connecting armature 15 to battery 22 for the purpose of charging the latter. In this circuit is an automatic switch 58 which may be of any well known design adapted to close when the voltage of armature 15 is sufficient to charge the battery, and to open when said voltage falls below that point. A series field 55 is also shown in this circuit, connected in the direction to oppose the flow of charging current and prevent excessive current at high speed. This charging circuit may be traced as follows: from brush 18, via 41, 39, 38, 56, 55, 57, switch 58, through battery 22, and conductor 35 to brush 17.

If the shaft A is driven by a prime mover which is not self-starting, such as a gasoline engine, the battery 22 may be used for this purpose by throwing the starting switch S into the position shown by the dotted lines. This reverses the connections of series field 20, and the machine X will now start up as an ordinary series wound motor, the circuit, starting from terminal 72 of battery 22, being traced via 73, 54, 52, 48, 50, 20, 49, 47, 51, 53, 14 through armature 11 to brush 13 and conductor 35 to terminal 74 of the battery. The rotation of armature 11 will drive gear wheel 9 in counter-clockwise direction, causing gear wheels 6 and 3 to rotate clockwise and start the prime mover through gear wheel 1. Gear wheel 8 must remain practically stationary to act as a fulcrum against gear wheel 5. If the resistance of the load driven by shaft B is not sufficient for this purpose any suitable braking device (not shown in the drawings) may be employed. Such a brake may be conveniently controlled by the rod 75 attached to the upper end of rheostat arm 29, so that the brake will be applied when the handle 30 is thrown to the extreme right.

If, while shaft A and gear wheel 1 are rotating in clockwise direction, the arm 7 be held stationary as by means of a brake 76 applied to the outer periphery of casing 69, gear wheel 8 and shaft B will be compelled to rotate in counter-clockwise direction. This affords a convenient means for reversing the direction of rotation of shaft B without any gear shifting. Or, if shaft A is held stationary and shaft B is free to revolve, the starting of machine X as a motor by throwing over switch S, as described above, will cause shaft B to rotate counter-clockwise. In this case, arm 7 must be left free to revolve.

Fig. 3 shows a modification of the electrical circuits of Fig. 1. The arrangement of gear wheels would be the same, and that part of Fig. 1 has not been repeated. In Fig. 3, the battery 22 is permanently connected in circuit between brush 13 of machine X and brush 17 of machine Y. From the description given in connection with Fig. 1 it will be noted that the direction of current in this circuit is always the same, and in Fig. 3 the battery is assumed to be connected so that this current will charge the cells. No automatic switch is required, as the design is such that the circuit through the two armatures and the battery is closed only when the resultant voltage of the two machines is sufficient to maintain the charging current. This result is secured by designing the rheostat R so that contact is made between 31 and 32 and exciting current is thus established in field winding 19 before the armature and battery circuit is closed at 39 and 37. The circuit of field winding 19 may be traced from battery terminal 74 via 19, 34, 27, 32, 31, 33, 79 to battery terminal 72. The armature and battery circuit may be traced from brush 14 via 53, 51, 46, 48, 50, 20, 49, 47, 45, 44, 43, 37, 39, 41, 18, armature 15, 17, 78, 22, 77 to brush 13.

In Fig. 3, auxiliary contact 36 and resistance 42 of Fig. 1 have been omitted, which may be done if the resistance of the balance of the circuit is sufficient. In this figure, clutch 59 has also been omitted, so that current must always be maintained in the armature under normal operating conditions. Furthermore it will be noted that whereas in the method of operation described in connection with Fig. 1, the clutch 59 was thrown into engagement when quill 10 had attained the same speed as shaft B, in the arrangement shown in Fig. 3, the speed of quill 10 may be carried beyond this point by still further increasing the reversed excitation of field coil 21 and shaft B will then be rotating at a higher speed than shaft A.

The apparatus described above may be adapted, by suitable design, for regenerative braking and control. This involves a reversal of power transmission, so that power will be transmitted from shaft B to shaft A. Under these conditions, while the direction of rotation of the various parts will remain the same, the application of forces and the reactions of the gear wheels will be reversed in direction throughout. Therefore the torque of the two armatures 11 and 15 must be reversed. This result may be accomplished as follows:—if, while running normally with the rheostat arm 29 in some intermediate position, this arm should be suddenly thrown to the right, the field excitation of machine Y will be built up in a direction to oppose the normal flow of current through the two armatures, and if arm 29 is moved far enough this current will be reversed, thus reversing the torque of both machines.

It will be noted that as the current in field coil 21 is increased by moving rheostat arm in either direction from the neutral position, the current in field winding 19 will also be increased. This result may in some cases be a distinct advantage, as it increases the torque and the electro-motive force of both machines simultaneously.

It will be noted that a considerable part of the energy is transmitted between the two shafts by direct mechanical contact between the gear wheels. By adopting suitable gear ratios, the reactive torque of machine X may be multiplied several times, and this machine may, therefore, be designed of small size and for high speed operation. The armatures of both machines are the only revolving parts, the field frames and brushes being stationary.

The clutch 59 illustrates one of the many means that may be employed for mechanically interlocking the mechanism so that the two shafts A and B will rotate at the same speed and the entire power will be transmitted mechanically. Obviously many other and equivalent mechanical interlocking means may be employed for this purpose.

It will be noted that the combination of gears shown constitutes a form of so-called "planetary" gearing, and is arranged to interconnect, mechanically, the three shafts A, B, and 10, and that when power is applied to one of these shafts, it is transmitted to one of the others only when mechanical torque is applied to the third. Rotation of the third shaft, combined with such torque, necessarily develops energy. In the apparatus described this torque is developed electro-dynamically and the energy is transformed to electrical energy and reconverted into mechanical energy by means of the two dynamo-electric machines X and Y. The control of this energy transfer both in amount and direction, and the resulting control of speed ratio of the shafts is effected by field controlling means.

It will be obvious that many modifications in details may be made in the apparatus shown and described without departing from the spirit of the invention.

What I claim and desire to secure by Letters Patent is:—

1. In combination, a driving shaft and its internal gear wheel, a driven shaft and its external gear wheel, an auxiliary shaft coaxial with the driven shaft and its external gear wheel, three planetary gear wheels rigidly interconnected and meshing respectively with the three shaft gear wheels, two dynamo-electric machines electrically interconnected, whereof one is mechanically connected to the driven shaft and the other to the auxiliary shaft, and field controlling means for controlling the transfer of electrical energy between the two machines.

2. In combination, a driving shaft and its internal gear wheel, a driven shaft and its external gear wheel, an auxiliary shaft coaxial with the driven shaft and its external gear wheel, three planetary gear wheels rigidly interconnected and meshing respectively with the three shaft gear wheels, two dynamo-electric machines electrically interconnected, whereof one is mechanically connected to the driven shaft and the other to the auxiliary shaft, field controlling means for controlling the transfer of electrical energy between the two machines and a brake mechanism for the planetary wheels for reversing the direction of rotation of the driven shaft.

In testimony whereof I have duly executed these presents this fourteenth day of April 1917.

JOSEPH LESTER WOODBRIDGE.

Witnesses:
  H. E. HUNT,
  W. G. ROGERS.